July 22, 1952 C. J. CRETORS 2,604,030
CORN POPPING MACHINE
Filed Aug. 6, 1947 3 Sheets-Sheet 1
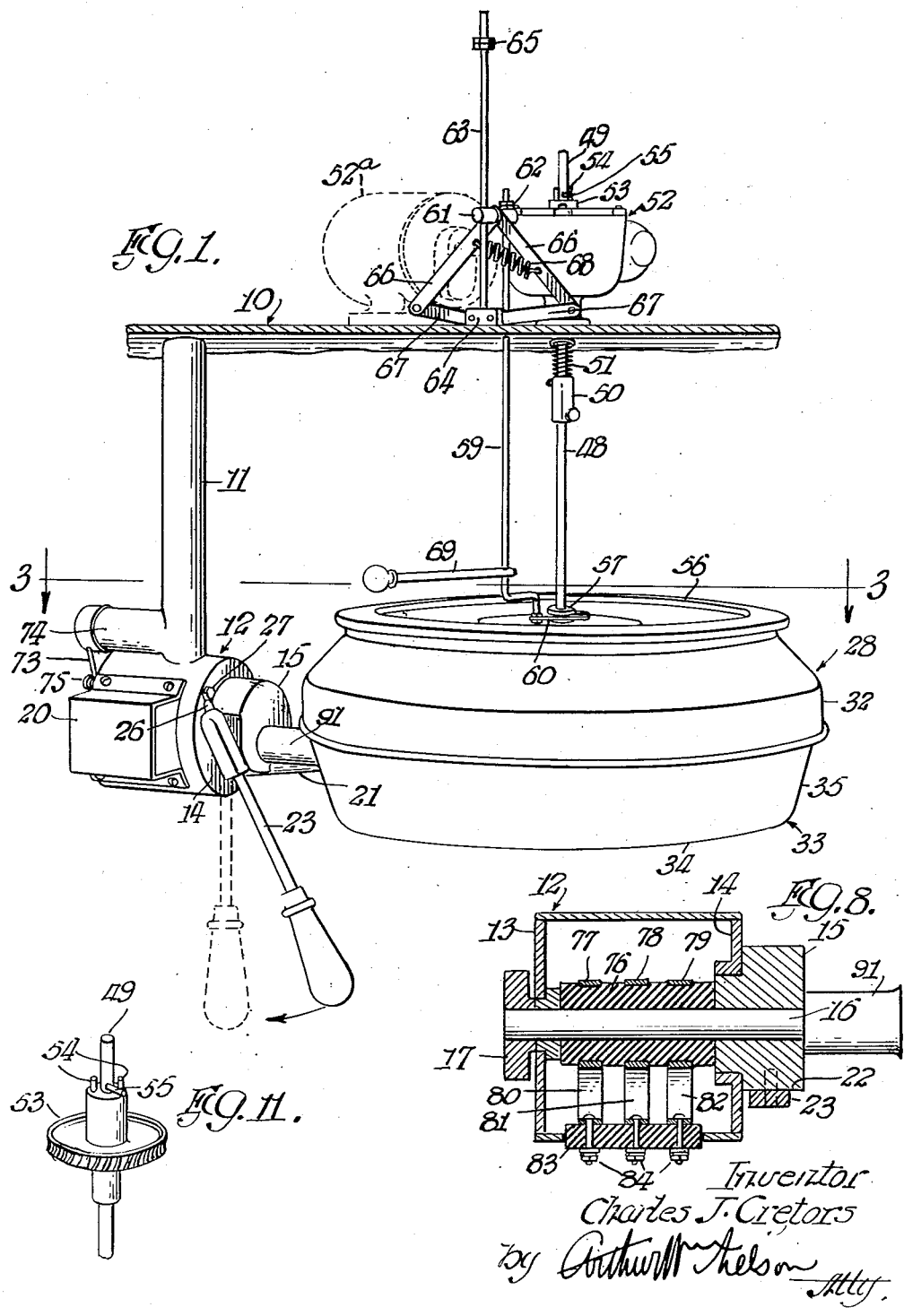
Inventor
Charles J. Cretors
by Arthur W. Nelson
Atty.

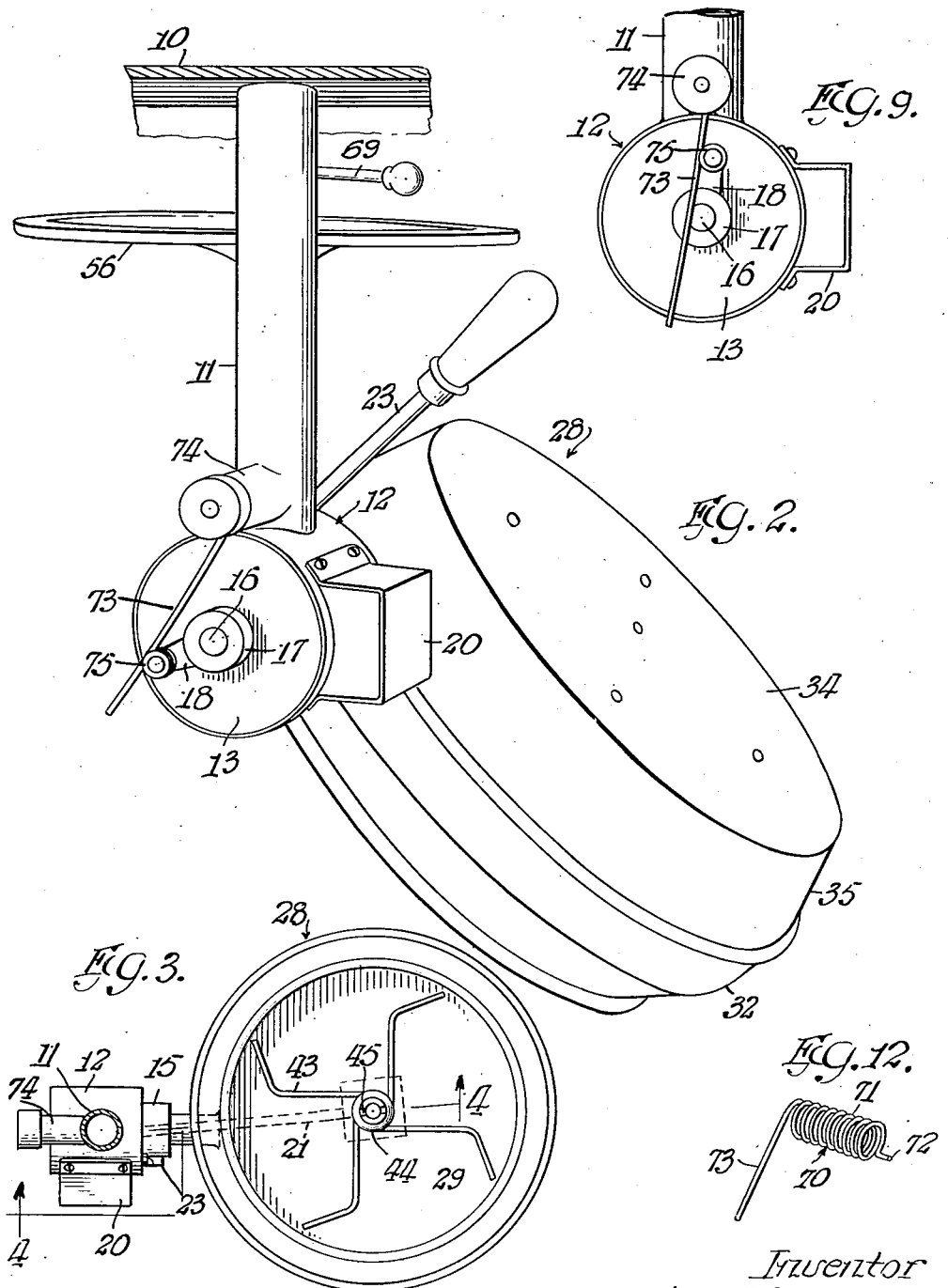

July 22, 1952 — C. J. CRETORS — 2,604,030
CORN POPPING MACHINE
Filed Aug. 6, 1947 — 3 Sheets-Sheet 3
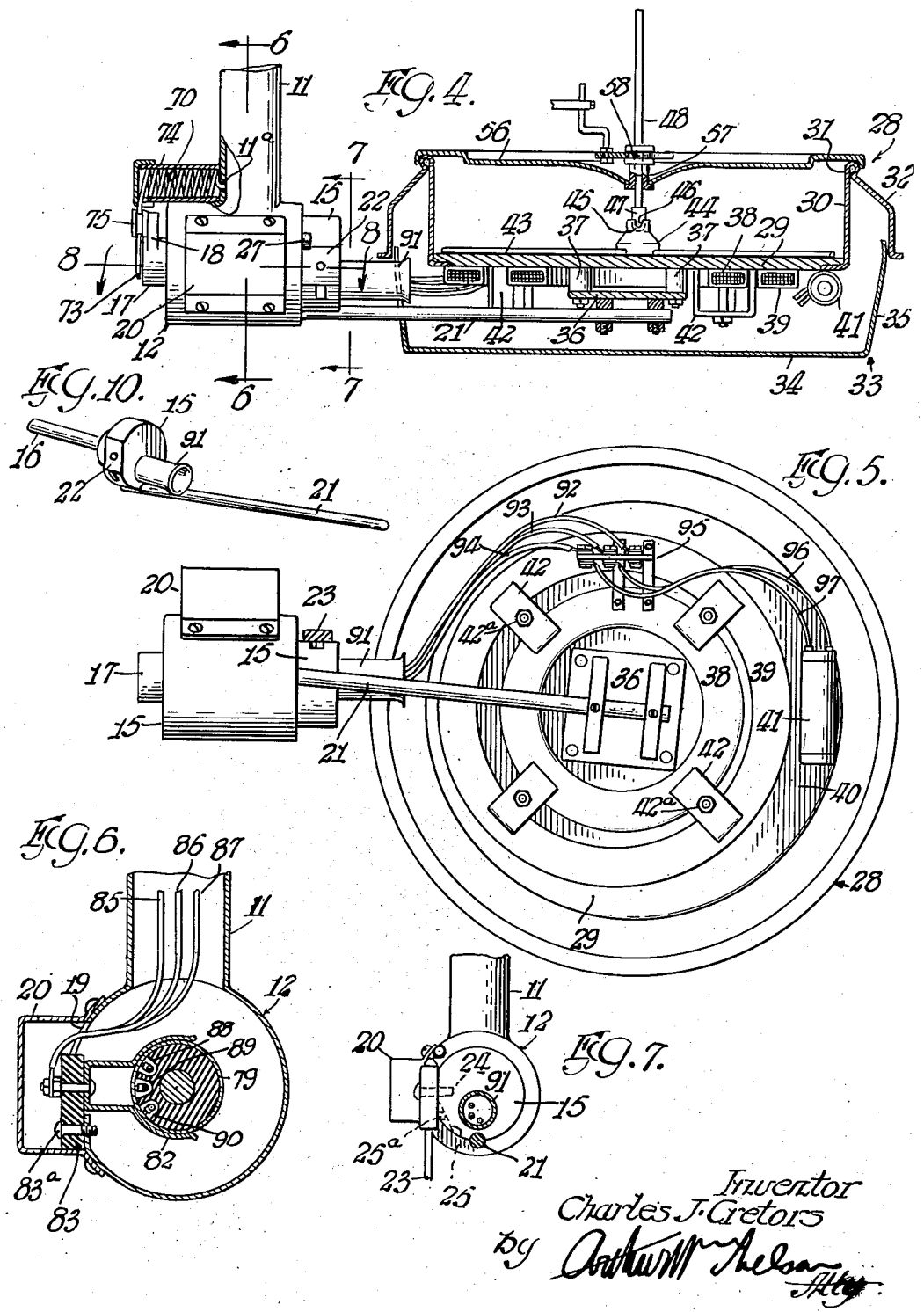
Inventor
Charles J. Cretors Patented July 22, 1952

2,604,030

UNITED STATES PATENT OFFICE 2,604,030

CORN POPPING MACHINE

Charles J. Cretors, Highland Park, Ill., assignor to C. Cretors & Co., Chicago, Ill., a corporation of Illinois Application August 6, 1947, Serial No. 766,599

9 Claims. (Cl. 99—238.5)

1

This invention relates to improvements in corn popping machines and it consists of the matters hereinafter described and more particularly pointed out in the appended claims.

The invention is more especially concerned with a corn popping machine of the kind that includes an open top popping pan, capable of turning about an axis from its horizontal popping position to its dumping position, upon a disconnection between the agitator, journalled in the pan, and its longitudinally movable vertical drive shaft and upon which the cover for the pan is slidably mounted for movement away from and toward the pan as the latter is turned from its popping position to its dumping position and back to said popping position. A corn popping machine of this kind is illustrated and described in my prior United States Patent 2,112,358 of March 29, 1938.

In a corn popping machine of this kind, it is desirable to have the disconnection between the agitator in the pan and its longitudinally movable drive shaft occur substantially at the instant of initial separation therebetween, not only so that there may be no binding action in the coacting clutch elements, between said agitator and shaft, which might bend the latter, but also to afford a greater clearance between the shaft and the pan when the latter is turned to its dumping position.

One of the objects of the present invention is to provide an improved mounting for the pan which permits a substantially instantaneous disconnection between the agitator in the popping pan and its drive shaft in the initial part of the movement of the pan from its popping position to its dumping position, and which also affords a greater clearance between the shaft and the pan as the latter is turned toward its dumping position.

Another object of the invention is to provide in a machine of this kind a novel arrangement between the popping pan and the drive shaft, whereby the drive shaft is spaced laterally from and off-center with respect to the horizontal axis about which the pan turns from one position to the other and toward the same side of said axis as that in which one side of the pan swings downwardly from popping to dumping position, so that in this movement of the pan an instantaneous disconnection occurs between the agitator and its drive shaft.

A further object of the invention is to provide simple and efficient means in a machine of this kind for accelerating the final parts of the swinging movement of the pan from one position to the other, thereby affording a counterbalancing effect which reduces the effort required on the part of the operator in turning the pan from one position to the other and reduces the operator's fatigue at the end of a day's work in operating the machine.

The above mentioned objects of the invention, as well as others, together with the advantages thereof, will more fully appear as the specification proceeds.

In the drawings:

Fig. 1 is a perspective view of a portion of corn popping machine, embodying the preferred form of the invention, with the popping pan thereof in popping position.

Fig. 2 is a perspective view of certain of the parts appearing in Fig. 1 on a slightly enlarged scale, when viewed from the left hand side of said Fig. 1, with the popping pan in its dumping position.

Fig. 3 is a horizontal sectional view through parts of the machine as taken on the line 3—3 and on a scale smaller than Fig. 1 and with the cover of the popping pan omitted, better to show the parts within the popping pan.

Fig. 4 is a vertical sectional view through parts of the improved corn popping machine, as taken on the line 4—4 and on a scale enlarged over that of Fig. 3.

Fig. 5 is a bottom view of parts appearing in Fig. 4, with the bottom cover pan omitted better to show the arrangement of parts on the bottom of the popping pan.

Fig. 6 is a vertical sectional view through parts appearing in Fig. 4 as taken on the line 6—6 and on a scale enlarged over said Fig. 4.

Fig. 7 is a vertical detail sectional view as taken on the line 7—7 and on the scale of Fig. 4.

Fig. 8 is a horizontal sectional view through parts appearing in Fig. 4, as taken on the line 8—8 and on a scale enlarged over that of Fig. 4.

Fig. 9 is a view in side elevation of parts appearing at the left hand side of Fig. 2 with certain of said parts in a changed relation.

Fig. 10 is a perspective detail view showing a sub-assembly embodied in the improved machine and which will be more fully referred to later.

Fig. 11 is a detail perspective view of a gear element and associated portion of the agitator driving shaft embodied in the machine and which will be more fully referred to later.

Fig. 12 is a perspective view of a certain pan counter-balancing spring embodied in the improved machine.

Referring now in detail to that embodiment of the invention illustrated in the drawings, 10 indicates a part of the top wall of the casing of the improved corn popping machine, which supports substantially all of the operating mechanism therefor.

Suitably fixed at its top end to and extending downwardly from a part of the wall 10 is a vertical tubular post or standard 11, which terminates at the bottom as a horizontally disposed hollow housing 12 having outer and inner end walls 13 and 14 respectively, which best appear in Fig. 8. A pan supporting member 15 is journalled in the end wall 14 and it has one end of a stub shaft 16 fixed thereto. The other end of said shaft is journalled in the end wall 13 and projects therebeyond to have a collar 17 fixed thereto. This collar, which includes a radial arm 18, operatively secures the member 15 and its shaft 16 in the housing 12 for a turning movement. The purpose of the arm 18, which appears best in Figs. 2 and 9, will appear later.

The housing 12 encloses a current distributing mechanism for the heating means of the popping pan of the machine and in one side of said housing is an opening 19 (see Fig. 6) which is normally closed by a removable box-like cover 20. The said current distributing mechanism and heating means above mentioned will soon be described in more detail.

One end of a horizontally disposed pan supporting arm 21 is fixed to the member 15 at a point spaced radially from the axis thereof and extends outwardly therefrom at a rather oblique angle to said axis. A peripheral portion of the member 15 is flattened off as at 22 and the normal upper end of a turning lever 23 is pivoted thereto by a stud 24 (see Fig. 7) for a limited lateral swinging movement. Adjacent the flattened portion the periphery of the member 15 is provided with a recess 25 in which a pin 25a, carried by said upper end of the lever, enters so that the sides of said recess act as stops for limiting the lateral swinging movement of the lever. Said upper end of the lever carries a tip 26 for engagement under a stop 27 on the housing wall 14 when the lever is swung counterclockwise in Fig. 1 and this limits the turning movement of the member 15 to that position affording the popping position for the popping pan (later mentioned) and supported by the arm 21.

The popping pan, which is indicated as a whole as at 28, includes a relatively thick bottom 29 and a relatively thin upright side wall 30, the upper edge of which is formed with a bead 31 that defines the open top of the pan. A skirt 32 extends downwardly and outwardly from said bead to terminate at substantially the plane of the bottom of the popping pan 28. This popping pan is annular in plan and its center is offset laterally from the horizontal axis, about which the pan turns from one position to the other and toward the same side of said axis in which one side of the pan swings downwardly from the popping to dumping position.

Associated with said skirt 32 is a lower cover pan 33, the bottom 34 of which is disposed below the supporting member 21 and the side wall 35 of which extends upwardly inside of the bottom margin of the skirt and is detachably connected thereto so that the cover pan 33, skirt 32 and pan 28 form a unitary structure for turning movement.

A part of one side of the skirt 32 and the wall 35 of the cover pan is cut away for the passage of the pan supporting arm 21 therethrough. This arrangement best appears in Fig. 4.

Fixed to the other end of the arm member 21 is a plate 36, which is arranged centrally of the pan bottom and to which it is fixed in spaced relation by means of relatively short posts and bolts 37, which are fixed to the pan bottom and extend through said plate and collar to receive associated clamping nuts. These parts best appear in Figs. 4 and 5.

Associated with and in intimate engagement with the pan bottom on the underside thereof are annular inner and outer electrical heating elements 38 and 39 respectively. The inner element 38 is arranged substantially coaxially with the axis of the pan bottom and the outer element 39 is arranged eccentric with respect thereto so as to have one side disposed substantially coincident with that part of the pan bottom nearest the member 15. By this off-center or eccentric arrangement of said outer element, a space 40 (see Fig. 5) is provided at that side of the pan bottom opposite to the first mentioned side, to which a thermostat 41, that controls the action of said elements, may be directly engaged with the pan bottom without unduly enlarging the diameter of the pan bottom. This affords desired engagement for accurate control action.

The elements 38 and 39 are removably fixed to the pan bottom by means of U-shaped clips 42 that straddle the space between said elements and engage therewith to be fixed to the pan bottom by associated nuts and bolts 42a, the latter of which depend from the pan bottom.

Resting on the top side of the pan bottom is an agitator 43 (see Fig. 3) having a hub 44, which is suitably journalled axially in the pan bottom for rotation. The upper end of said hub is provided with upwardly opening notches 45, in which a cross pin 46, on a member 47, carried by the bottom end of the lower section 48 of the driving shaft for the agitator, is adapted to be detachably engaged. The upper section of this drive shaft is indicated at 49 and these sections are detachably connected together by a coupling 50. A spring 51 surrounds a part of the upper shaft section between said coupling 50 and the casing top wall 10 to normally urge the shaft as a whole downwardly. The purpose of this spring will appear later. The top section of this shaft extends up through the casing wall 10 and has a sliding guided engagement through a speed reducing gear casing 52. A rotative part of said reducing gear in said casing, in the form of a worm gear 53 (see Fig. 11) carries a pair of spaced upright pins 54 and the upper end of said upper shaft section 49 carries a cross pin 55. This cross pin is so arranged on the shaft that when the pin 46 at the bottom end thereof engages in the notch 45 of the agitator hub, the cross pin 55 will engage the pins 54 and be driven thereby to turn or rotate the agitator. The drive shaft for the reducing gearing may be driven in any suitable manner as by an electric motor 52a that may be supported by the casing top wall 10. Should the operator "slam" the pan too hard in the turning of the pan from its dumping back to its popping position, so that the hub 44 too forcefully engages the coacting member 47 on the lower shaft section, the shaft comprising said sections 48—49 can yield upwardly to such a degree that the pin 55 momentarily disengages from the pins 54 mentioned. The spring 51 then returns the shaft to its normal position to again cause a driving connection for said shaft and part 53 of the speed reducing gear casing 52. Thus, should the operator "slam" the popping pan 28 when swinging it back to popping position the shaft comprising said sections cannot bend to thereafter stall and damage the motor for driving the reducing gearing in the casing 52.

The cover for the open top of the pan is indicated at 56 and it normally rests, during initial part of a corn popping operation, at its peripheral margin upon the bead 31 of the popping pan to close the open top thereof, as appears in Fig. 4. This cover has a grooved central hub 57 that has a sliding guided engagement on the lower shaft section 48 and in said hub is an annular groove 58.

Arranged parallel with the shaft sections 48—49 is a rod-like stem 59, the bottom end of which is offset laterally toward said shaft section and said bottom end of the stem carries a yoke 60 that engages within the groove in the hub 57. The upper end of said stem extends through the casing wall 10 with a sliding action and the upper extremity of said stem slides through one end of a cross head bar 61, with stop nuts 62 above said bar. The other end of said cross head bar slidably engages upon an upright post 63, the bottom end of which is fixed in a block 64 secured to the top surface of the wall 10. The top end of this post carries stop nuts 65 for engagement by the cross head bar 61. Links 66 are pivotally connected at their upper ends to the cross head bar 61 and at their lower ends are pivotally connected to associated upper ends of links 67—67, the other ends of which are pivotally mounted in the block 64. A contractible coiled spring 68 is connected at its ends to the links 66 and tends to swing the lower ends of said links toward each other.

When the cover 56 is in its closed position upon the bead 31 of the popping pan, as at the beginning of a popping operation, the links 67 occupy a position, extending slightly upwardly from the horizontal, as appears in Fig. 1 and the spring 68 will be in a stretched or extended position. The parts described are so correlated that the weight of the cover 56 and rod 59 and parts thereon approximately counterbalance the contracting action of the spring 68, which is not strong enough to function at this time through the links 66—67 to raise the stem 59 and cover 56 unless the cover is given an initial upward start. When corn is popping in the pan, it increases in volume and tends to lift the cover so as to spill out from the pan. When this popped corn has increased in volume to that extent sufficient to raise the cover, such raising of the cover affords that start for the spring 68 so that it then functions to draw the links 66—67 toward each other. This movement of the links, through the cross head bar 61 and stop nuts 62 on the stem, imparts a quick upward lift on the cover to slide the same upwardly on the shaft section 48 to such an elevation and into the position shown in Fig. 2, as affords clearance between the cover and pan when the latter is being swung toward dumping position.

It may sometimes be desired to manually lift the cover into its elevated position, as when charging the pan with unpopped corn. For this reason, I secure to the stem 59 a handle 69. Of course, when the cover is elevated by means of the handle, the spring 68, through the linkage mentioned, will retain the cover in said elevated position until it is desired to return it to its closed position on the popping pan.

To assist in turning the pan (by means of the lever 23) from its popping position to its dumping position, counterbalancing mechanism is provided therefor and such mechanism is associated with the outer end wall 13 of the housing 12. Such mechanism includes a horizontal disposed spring 70 which best appears in perspective in Fig. 12. This spring includes a coiled body 71, the convolution at the inner end of which is formed as a short longitudinal stud 72 and the convolution at the other end of which extends tangentially of the body as an arm 73. Said spring is located in a horizontally disposed housing 74 on the post 11 just above the housing 12. The stud 72 of said spring is anchored in an opening 11a (see Fig. 4) in the post 11 and the arm 73 of said spring normally bears against a roller 75 carried by the arm 18 of the collar 17, before mentioned.

When the popping pan 28 is in popping position, as in Fig. 1, the arm 18 stands in a substantially upright position, as in Fig. 9, with its roller 75 bearing against an upper portion of the spring arm 73. It is obvious that said spring arm is the least flexible adjacent the coiled body 71 and becomes more flexible toward its free end. Therefore, the spring arm 73 exerts its greatest force against the arm 18 when it is in the position appearing in Fig. 9 and which corresponds to the popping position for the pan 28. Therefore, said spring arm tends to yieldingly urge said pan toward popping position and in which it is releasably held by reason of the engagement of the stud 26 under the stop 27. As the pan is swung toward dumping position by means of the lever 23, the initial part of this movement is offered its greatest resistance by the spring arm 73 and as the roller 75 travels downwardly toward the free end of said arm the resistance decreases and is the least when said roller 75 is in the position appearing in Fig. 2 and when the pan is in dumping position. In this movement of the pan toward dumping position, the popped corn is spilling from the pan and the resistance of the pan to such movement decreases as the pan approaches dumping position. When the pan is in the dumping position as in Fig. 2 the resistance offered by the spring arm is the least in force so that when the lever 23 is released the pan swings or settles back to a position wherein the plane of its diameter will assume a substantially vertical position. In the return swinging movement of the pan back to popping position, the initial part thereof is first resisted by said spring arm and is then accelerated thereby. Thus a counterbalancing effect is afforded for the pan in its swinging movement from one position to the other.

Operatively secured to the shaft 16, within the housing 12, between the member 15 and bushing end wall 13 of said housing, is a sleeve of insulation 76, best shown in Figs. 6 and 8. On this sleeve is mounted a plurality of longitudinally spaced current distributor rings 77, 78 and 79 respectively.

Associated with and in operative engagement with opposite sides of said rings are brushes 80, 81 and 82 respectively of a generally U-shaped formation, as appears in Fig. 6. These brushes are each attached to a block 83 of insulation, by a terminal 84. Said block is disposed in the opening 19 in the housing 12 and is enclosed by the cover 20, before mentioned, and is fixed in supporting relation to the housing by means of screws 83a, one of which appears in Fig. 6. Associated with each bolt 84, outside the insulation block 83, are the usual nuts whereby current conductors 85, 86 and 87 (see Fig. 6) that lead from a suitable circuit and down through the member 11 and into the housing, may be connected to the associated brush 80, 81 and 82 respectively.

The sleeve 76 is provided with a plurality of longitudinal channels 88, 89 and 90 respectively (see Fig. 6) each of which stops at one end in the plane of an associated ring 77, 78 and 79 respectively, and each of which communicates with a tubular extension 91 fixed at one end to the member 15 and having its other end opening through the side wall 35 of the bottom cover to extend into the latter. In said set of channels mentioned are current conductors 92, 93 and 94 respectively, which lead to a terminal block 95 (see Fig. 5) on the underside of the pan bottom, for both heating elements 38 and 39. Other conductors 96 and 97 connect the thermostat 41 to said block for a control of the action of said elements.

The operation is as follows: The normal position of the popping pan is the horizontal popping position appearing in full lines in Fig. 1, with the cover 56 in position closing the open top thereof. Said pan is releasably locked in this position by reason of the engagement of the stud 26 with the stop 27 on the wall 14 of the housing 12. By grasping the handle 69 and lifting upwardly thereon, the cover 56 may be lifted into an elevated position above the pan, exposing the open top of the pan so that unpopped corn, seasoning and salt may be readily introduced into the pan. When said handle is pressed down, the cover slides down the shaft section 48 into its closed position on the bead 31 of the popping pan. When the cover is in its closed position on the bead, the linkage 66—67 is in the position appearing in Fig. 1 and said linkage and its spring is in substantial balance with the weight of the cover 56.

Assuming at this time that the conductors 85, 86 and 87 are connected to a source of current, it is obvious that current flows through the brushes 80, 81 and 82, rings 77, 78 and 79 and conductors 92, 93 and 94 to the terminal block 95 so that the elements 38 and 39 are energized to heat the pan bottom 29. By reason of the eccentric arrangement of said elements, as before described, the heating of the pan bottom is not spotty but is even and uniform over its entire area. When the corn begins to pop in the pan, it swells or increases in volume and when this volume reaches the cover, it will lift the same from its position on the bead 31.

In the initial opening or raising of the cover, the balance between the linkage and spring and the cover is changed so that the spring 68 tends to contract and draw the links 66, 67 on one side of the post 63 toward the companion links on the other side thereof. In this movement of the links, the cross head bar 61 slides up the post 63 and engages the nuts 65 thereon as a stop. In this movement of the linkage the crosshead bar will, through the stop nuts 62 on the stem 59 pick up and lift the same and the cover into the full line position shown in Fig. 2 for a free flow or spilling out of the part of the popped corn from the top of the pan.

When the popping ceases, the operator grasps the lever 23 and swings the same laterally clockwise from the full line position to dotted position (see Fig. 1) to release the stud 26 from the stop 27 and then swings said lever upwardly to dump the remainder of the popped corn from the pan.

When the lever is swung upwardly, by reason of the lateral off-center arrangement between the axis of the shaft 16 and the axes of the shaft parts 48—49, as the pan swings toward dumping position, an instantaneous separation or disconnection will take place between the hub 44 of the agitator and the member 47 on the lower shaft section. In this movement of the pan that side of the pan farthest away from the operator, who is assumed to be on the near side (Fig. 1), will swing downwardly and that side of the pan nearest the operator will swing upwardly. Also, in this movement of the pan, by reason of the angular arrangement of the pan supporting arm 21, the pan in its swing, toward dumping position, will swing away from the axis of the shaft parts 48—49 toward the operator, thus affording a positive clearance of the pan with reference to the cover. This movement of the pan from popping to dumping position, is somewhat greater than 90° so that a complete emptying of the pan of popped corn is assured. When the pan is in its dumping position, as in Fig. 2, the lever is stopped at an upward angle toward the operator, as shown, and in which position it may be readily grasped to swing the pan back to popping position. Furthermore, with the arrangement described, the separation between the agitator hub and the shaft section occurs the instant the pan begins to turn so that no binding effect occurs between the agitator hub 44 and the member 47 to interfere with the free turning or swing of the pan toward dumping position. In this turning movement of the popping pan from one position to the other, the spring 70 functions to counterbalance the weight of the pan in both directions, as previously described.

After the popped corn has been dumped from the pan, the latter is swung back toward its popping position, by a pull downwardly on the lever 23 and when popping position has been reached, said lever is swung counterclockwise to dispose the stud 26 under the stop 27 so the pan is again releasably locked in popping position ready for the next charge of unpopped corn. As the pan approaches popping position, the hub 44 of the agitator makes a driving connection with the member 46 on the bottom end of the shaft section 48. Should the operator "slam" the pan back to popping position too forcefully so as to cause the hub to engage said member 46, this will lift the shaft sections 48 and 49 jointly upwardly against the action of the spring 51 and momentarily disengage the pin 55 from the pins 54. Thus the drive shaft for the agitator is momentarily disengaged from the speed reducing gear in the casing 52 so that the motor employed to drive such gear cannot be stalled or damaged and the shaft comprising the sections 48—49 cannot become bent.

After the pan has again been charged with unpopped corn, the handle 69 is pulled downwardly and this will open the linkage 66—67 and replace the cover 56 in the bead 31 to close the pan for another popping operation.

With the arrangement of parts described, a quicker action and better timing is possible in the releasing of driving power to the agitator and in the upward movement of the cover to provide a free clearance for a turning movement of the pan into its dumping position.

While in describing the invention I have referred in detail to the form, arrangement and construction of the parts involved, the same is to be considered only in the illustrative sense and,

I claim as my invention:

1. In a corn popping machine, means arranged for turning movement about a horizontal axis, a popping pan having a normally horizontal popping position operatively supported by said means and turnable about said axis from said popping position into a dumping position, an agitator, and a drive shaft therefor having a vertical axis offset to one side of said horizontal axis when the pan is in popping position, a lever-like member pivotally mounted near one end on a part of said first mentioned means so that its other end may be swung toward and away from said pan, and means carried by the first mentioned end of said lever-like member when its other end is swung toward the pan to engage a fixed part of the machine to releasably lock the pan in said popping position.

2. In a corn popping machine, a fixed supporting member, means journalled in said member for a turning movement about a horizontal axis, a popping pan having a normally horizontal popping position operatively supported by said means and turnable therewith about said axis from said popping position into the dumping position for said pan, a second member fixed with respect to said means, and means carried by said supporting member and including a resilient arm against which said second member has engagement when the pan is turned from one position to the other.

3. In a corn popping machine, a fixed supporting member, means journalled in said member for a turning movement about a horizontal axis, a popping pan having a normally horizontal popping position operatively supported by said means and turnable therewith about said axis from said popping position into the dumping position for said pan, an agitator journalled in said pan for rotation about a vertical axis offset to one side of said horizontal axis when said pan is in popping position, a drive shaft for said agitator arranged in said vertical axis, coacting means on said agitator and said shaft respectively adapted for engagement when said pan is in popping position to form a driving connection between said agitator and said shaft and adapted for disengagement in the initial part of the turning movement of the pan toward dumping position to break said driving connection, a lever pivotally mounted near one end on a part of said first mentioned means so that its other end may be swung toward and away from said pan, and means carried by the first mentioned end of said lever member when its other end is swung toward said pan to engage a fixed part of said supporting member to releasably lock the pan in said popping position.

4. In a corn popping machine, a fixed supporting member, means journalled in said member for a turning movement about a horizontal axis, a popping pan having a normally horizontal popping position operatively supported by said means and turnable therewith about said axis from said popping position into the dumping position for said pan, an agitator journalled in said pan for rotation about a vertical axis offset from one side of said horizontal axis when said pan is in popping position, a drive shaft for said agitator arranged in said vertical axis, coacting means on said agitator and said shaft respectively adapted for engagement when said pan is in popping position to form a driving connection between said agitator and said shaft and adapted for disengagement in the initial part of the turning movement of the pin toward dumping position to break said driving connection, and members carried by said first mentioned means and by said supporting member respectively and operating in a part of the turning movement of the pan from the popping toward the dumping position to accelerate the movement of said pan into dumping position.

5. In a corn popping machine, a popping pan mounted for a turning movement about a horizontal axis from a popping position to a dumping position and vice versa, an agitator journalled in the pan for rotation about a vertical axis when the pan is in popping position, a drive shaft arranged in line with said vertical axis, means in which said shaft is operatively engaged for rotation as well as a limited longitudinal movement, coacting means on the bottom of said shaft and on said agitator respectively adapted for engagement when said pan is swung from said dumping position back into said popping position to form a driving connection between said shaft and said agitator and adapted for disengagement in the initial part of the movement of the pan as it is swung from said popping position to said dumping position, a driving member for said shaft, a clutch element carried by said driving member, a second clutch element carried by said shaft, yielding means normally urging the shaft longitudinally in that direction to operatively engage said clutch elements and drive said shaft from said driving member, said yielding means operating to permit a longitudinal movement of said shaft in the other direction sufficient to momentarily disengage said clutch elements from said driving member, said yielding means operating to permit a longitudinal movement of said shaft in the other direction sufficient to momentarily disengage said clutch elements when said coacting means on said agitator and the bottom end of said shaft are engaged with such force as the pan swings into popping position as to overcome the action of said yielding means.

6. In a corn popping machine, a popping pan mounted for a turning movement about a horizontal axis from a popping position to a dumping position and vice versa, an agitator journalled in the pan for rotation about a vertical axis when the pan is in popping position, a drive shaft arranged in line with said vertical axis, means in which said shaft is operatively engaged for rotation as well as a limited longitudinal movement, said shaft including upper and lower shaft parts and means for coupling said parts together, coacting means on the bottom end of said lower shaft part and on said agitator respectively adapted for engagement when said pan is swung from said dumping to said popping position to form a driving connection between said shaft and said agitator and adapted for disengagement in the initial part of the movement of the pan as it is swung from said popping position to said dumping position, a driving member from said upper shaft part, a clutch member carried by said driving member, a second clutch member carried by said upper shaft part, yielding means normally urging said shaft longitudinally downwardly to operatively engage said clutch elements and to drive said shaft from said driving member, said yielding means operating to permit a longitudinal upward movement of said shaft sufficient to momentarily disengage said clutch members when said coacting means on said agitator and on said lower shaft part are engaged with such force as the pan swings into popping position as to overcome the action of said yielding means.

7. In a corn popping machine, a stationary member, rotatable means carried by the stationary member and having a horizontal axis of rotation, a generally circular popping pan having a normally horizontal popping position, an arm fixed at one end to said rotatable means, extending therefrom and having its other end attached to the popping pan so as to support the center of the popping pan in a position laterally offset with respect to the horizontal axis of rotation of said rotatable means in an amount substantially less than the radius of the pan, whereby when the pan is in its popping position and said rotatable means is turned in one direction on its horizontal axis said arm swings in a direction causing the center of the pan bottom to move downward with respect to said horizontal axis, as the pan moves from its horizontal position toward inverted dumping position, an agitator journaled in the center of the popping pan, a drive shaft for the agitator having a vertical axis of rotation in vertical alignment with the center of the popping pan, and coacting means on said agitator and shaft adapted for engagement when said pan is in popping position to form a driving connection between said agitator and shaft and adapted for disengagement in the initial part of the movement of the pan toward dumping position to break said driving connection.

8. In a corn popping machine, a fixed support, a popping pan supporting member journaled at one end in said support, an arm secured to said member, a popping pan mounted on the other end of said member, means for turning said member from a popping to a dumping position, an arm carried by said member and resilient means carried by said support and engaged with said arm and normally acting thereon to turn the pan toward popping position.

9. In a corn popping machine, a stationary member, rotatable means carried by the stationary member and having a horizontal axis of rotation, a popping pan having a normally horizontal popping position, an arm fixed at one end to said rotatable means, extending therefrom and having its other end attached to the popping pan so as to support the center of the popping pan in a position laterally offset with respect to the horizontal axis of rotation of said rotatable means in an amount substantially less than one-half of the width of the pan as viewed from said horizontal axis, whereby when the pan is in its popping position and said rotatable means is turned in one direction on its horizontal axis said arm swings in a direction causing the center of the pan bottom to move downward with respect to said horizontal axis, as the pan moves from its horizontal position toward inverted dumping position, an agitator journaled in the center of the popping pan, a drive shaft for the agitator having a vertical axis of rotation in vertical alignment with the center of the popping pan, and coacting means on said agitator and shaft adapted for engagement when said pan is in popping position to form a driving connection between said agitator and shaft and adapted for disengagement in the initial part of the movement of the pan toward dumping position to break said driving connection.

CHARLES J. CRETORS.

REFERENCES CITED

The following references are of record in the file of this patent:

UNITED STATES PATENTS

| Number | Name | Date |
|---|---|---|
| 1,142,729 | Rathjen | June 8, 1915 |
| 2,112,358 | Cretors | Mar. 29, 1938 |
| 2,134,682 | Burch | Nov. 1, 1938 |